UNITED STATES PATENT OFFICE.

MORITZ ULRICH, OF ELBERFELD, GERMANY, ASSIGNOR TO THE FARBEN-FABRIKEN, VORMALS FR. BAYER & CO., OF SAME PLACE.

PROCESS OF MAKING DIOXYNAPHTHALINE MONOSULPHO-ACID.

SPECIFICATION forming part of Letters Patent No. 415,257, dated November 19, 1889.

Application filed August 29, 1889. Serial No. 322,348. (Specimens.)

*To all whom it may concern:*

Be it known that I, MORITZ ULRICH, doctor of philosophy, a subject of the Emperor of Germany, residing at Elberfeld, Prussia, Germany, assignor to the FARBENFABRIKEN, VORMALS FR. BAYER & CO., of Elberfeld, have invented a new and useful Process for the Production of new Dioxynaphthaline Monosulpho-Acids, of which the following is a specification.

My invention relates to the production of new chemical products by melting the salts of beta-naphthol alpha or $\alpha$ disulpho-acid (the so-called "R" acid) or beta-naphtol $\beta$ (or beta or gamma) disulpho-acid (the so-called "G" acid) with caustic alkali. These new isomeric products are adapted for the manufacture of dye-stuffs.

In carrying out my invention practically I proceed as follows: Twenty kilos of the soda salt of the beta-naphthol $\alpha$ disulpho-acid, (R salt,) dissolved in twenty liters water, are heated with twenty kilos caustic soda in a closed vessel, under continuous stirring, to 240° centigrade, till all R salt is changed to dioxynaphthaline monosulpho-acid. Then the melt is dissolved in water, sulphuric acid added slowly, and heated to boiling till all sulphurous acid passes off. After cooling, the soda salt of the dioxynaphthaline monosulpho-acid crystallizes in small leaves, or, if it does not, it precipitates by the addition of common salt. The same result is obtained by using, instead of caustic soda, caustic potash, or instead of a closed an open vessel.

If the beta-naphthol $\alpha$ or alpha disulpho-acid is replaced by the beta-naphthol $\beta$ or beta or gamma disulpho-acid by the so-called "G" acid, another new isomeric dioxynaphthaline monosulpho-acid is gained in the same manner and by the same process, which is distinguished from the above-mentioned isomeric product by the reaction with perchloride of iron and perchloride of lime. While the dioxynaphthaline monosulpho-acid of the R salt gives with perchloride of iron a clear violet and with perchloride of lime a yellow, the dioxynaphthaline monosulpho-acid of the G salt is changed to green with perchloride of iron and to red with perchloride of lime.

The new products, called by me "dioxynaphthaline monosulpho-acid" R and G, have the same composition, which is expressed by the following formula: $C_{10}H_5(OH)_2(SO_2OH)$.

What I claim as my invention, and desire to secure by Letters Patent, is—

The process of producing the new dioxynaphthaline monosulpho-acids herein described by melting the beta-naphthol $\alpha$ or alpha disulpho-acid (the so-called "R" salt) or the beta-naphthol $\beta$ or beta or gamma disulpho-acid (the so-called "G" acid) with caustic alkali at a temperature above 200° centigrade in an open or closed vessel.

In testimony whereof I have signed my name in presence of two subscribing witnesses.

MORITZ ULRICH.

Witnesses:
CARL DUISBERG,
RICHARD LAUCH.